United States Patent [19]

Matsumura et al.

[11] Patent Number: 4,829,773

[45] Date of Patent: May 16, 1989

[54] AIR FLOW VISUALIZING DEVICE

[75] Inventors: Fujio Matsumura, Tokyo; Naoki Sugita; Yutaka Hatta, both of Saitama, all of Japan

[73] Assignee: Midori Anzen Industry Co., Ltd., Tokyo, Japan

[21] Appl. No.: 180,366

[22] Filed: Apr. 11, 1988

[30] Foreign Application Priority Data

Apr. 18, 1987 [JP] Japan .................................. 62-94311
Jul. 24, 1987 [JP] Japan ................................ 62-184748

[51] Int. Cl.$^4$ .............................................. F17C 7/02
[52] U.S. Cl. ...................................................... 62/50
[58] Field of Search ............................................ 62/50

[56] References Cited

U.S. PATENT DOCUMENTS

| 3,564,861 | 2/1971 | Andersen et al. | 62/50 |
| 3,965,689 | 6/1976 | Brown et al. | 62/50 |
| 4,693,252 | 9/1987 | Thoma et al. | 62/50 |
| 4,698,976 | 10/1987 | Fieseler et al. | 62/50 |
| 4,771,608 | 9/1988 | Liu et al. | 62/50 |

Primary Examiner—Ronald C. Capossela

[57] ABSTRACT

An air flow visualizing device for introducing clean steam generating by a steam generating device into an insulating chamber in which a refrigerant such as liquid nitrogen or the like is enclosed so as to generate a misty tracer by rapidly cooling down the steam. The generated misty tracer is directly introduced into an air flow to be visually recognized or introduced after controlling the temperature of the misty tracer so as to be easily captured by the air flow.

4 Claims, 3 Drawing Sheets

AIR FLOW VISUALIZING DEVICE

BACKGROUND OF THE INVENTION

1. Industrial Field of the Invention

This invention relates to a device for realizing visual recognition of nonvisible air flow, and particularly relates to a device for realizing visual recognition of air flow which utilizes especially clean mist that is generated for the purpose of recognizing air flow in a clean room employed for industrial purposes.

2. Prior Art

Known devices for realizing visual recognition of nonvisible air flow are exemplified as follows:

(1) a device which utilizes mosquito-repellent incense smoke;

(2) a device which utilizes smoke generated by a chemical reaction of chemicals such as titanium tetrachloride;

(3) a device which utilizes oil mist generated by heating oil; and (4) a device which generates pure water mist utilizing pure water as in an ultrasonic humidifier.

However, the aforementioned devices which utilize mosquito-repellent incense, the smoke generated by the chemical reaction of chemicals, and the oil mist encounter following problems: namely, when visual recognition of clean air flow which has been introduced into a clean room for industrial purposes is attempted, not only the clean air is contaminated but also the clean room and machines and equipment in the clean room are contaminated. As a result of this, the manufacturing process for the products which need cleanness is contaminated. Consequently, the aforementioned devices become impossible to be used. Especially, in a case wherein the smoke generated by the chemical reactions of chemicals is utilized, it is dangerous because of their toxicity. In a case wherein the pure water mist is generated, the amount of the mist which can be generated is insufficient. If the sufficient amount of mist is generated, droplets drop to floor surfaces or work tables. Furthermore, the mist generated is eliminated in a short time after being introduced in an air flow, as a result of which, the long-distance visual recognition of the air flow becomes impossible. Furthermore, the mist tends to flow downward because of gravitation, and separate from the air flow, as a result of which, an accurately visual recognition of the air flow becomes impossible.

An object of the present invention is to provide an air flow visualizing device which can overcome the aforementioned problems by introducing clean steam generated by a steam generating device into an insulating chamber in which either one of liquid nitrogen, liquid oxygen, liquefied carbon dioxide, or the like is enclosed for the purpose of generating a misty tracer by rapid cooling. Then the generated misty tracer is directly introduced into an air flow to be visually recognized, or fed out after the temperature of the misty tracer has been controlled so as to be easily captured by the air flow.

OBJECT OF THE INVENTION

A first object of the present invention is to provide a device which is capable of realizing a long-distance visual recognition of air flow.

A second object of the present invention is to provide a device which is capable of delivering a misty tracer after adjusting the misty tracer to be easily capable of being captured by an air flow.

A third object of the present invention is to provide a device which is capable of generating a large quantity of a clean and nonpoisonous misty tracer.

A fourth object of the present invention is to provide a device which is capable of generating a misty tracer in such a manner that the generating of droplets can be minimized.

A fifth object of the present invention is to provide a device which is capable of generating a misty tracer with a safety operation ensured.

Aforementioned objects and features of the invention will become apparent from the following description when the same is read in connection with the accompanying drawings.

DETAILED DESCRIPTION OF THE PREFERRED EMBODIMENTS

Figure 1:
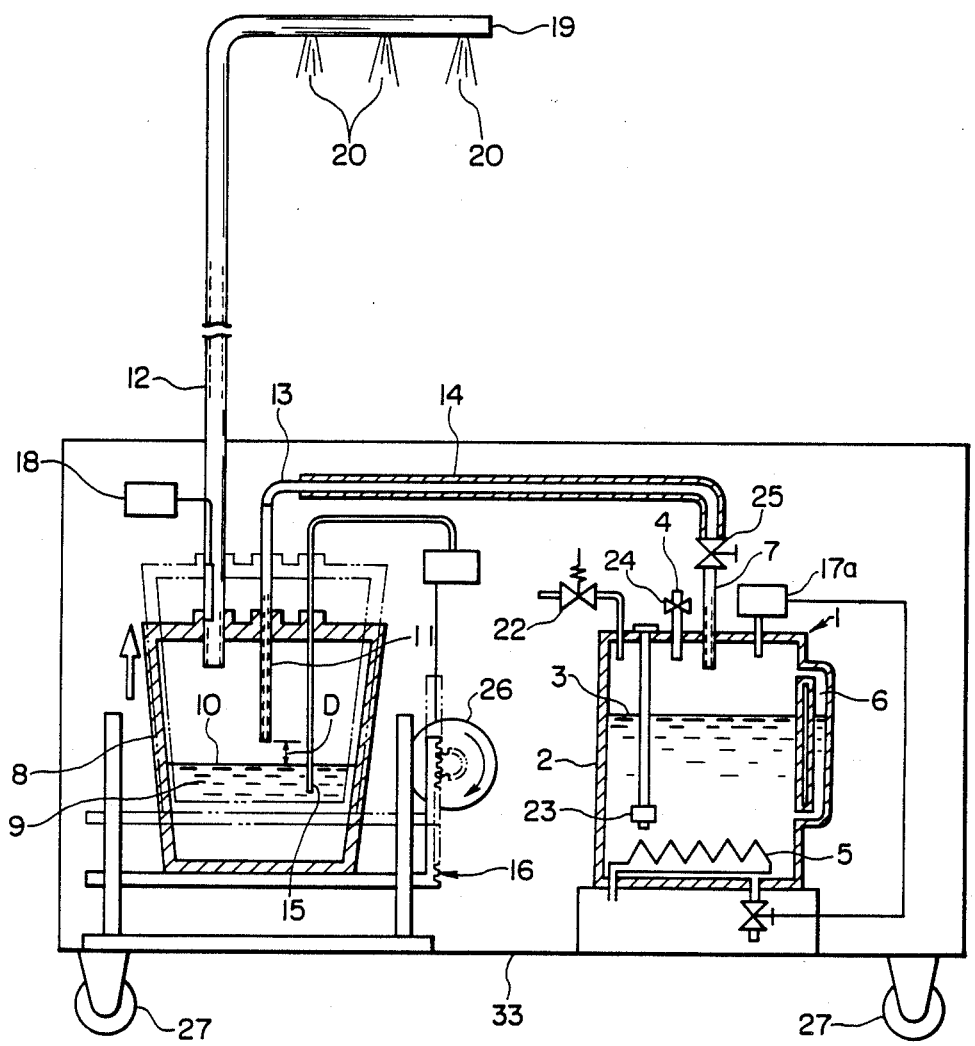
FIG. 1 illustrates an example of the structure of an air flow visualizing device according to the present invention.
Figure 2:
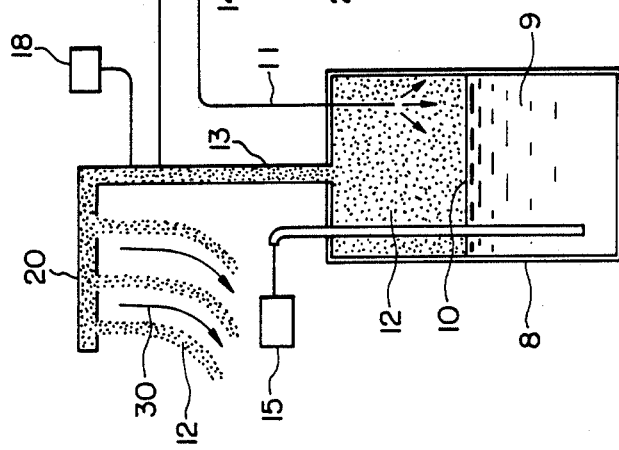
FIG. 2 illustrates a modified example of the aforementioned structure.
Figure 2:
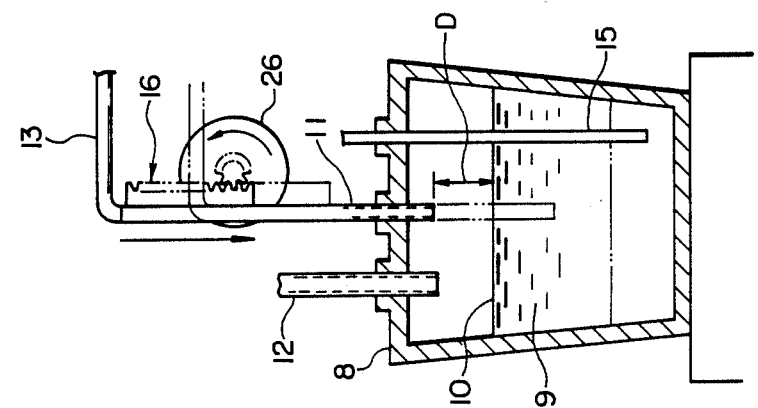

Referring to FIGS. 1 and 2, an embodiment of the present invention will now be described. Reference numeral (1) represents a steam generating device which comprises a water supply pipe (4) for supplying water (3) to a tank (2), a heater (5) for heating the water (3), a water level gauge (6) for measuring the level of the water (3), and a steam delivering pipe (7). Reference numeral (8) represents an insulating chamber in which liquid nitrogen (9) as an example of a refrigerant is enclosed. The insulating chamber (8) comprises an inlet pipe (11) which is supported at a predetermined distance D away from the liquid level (10) of the liquid nitrogen (9) and an outlet pipe (12) for delivering steam which has been cooled down in the insulating chamber (8). Reference numeral (13) represents a pipe for introducing steam from the steam generating device (1) to the insulating chamber (8). One end of the pipe (13) is connected to the steam delivering pipe (7), while other end is connected to the inlet pipe (11). Reference numeral (14) represents a heater which is fitted to the pipe (13), and reference numeral (15) represents a liquid level controller for detecting the liquid level (10). Reference numeral (16) represents a control mechanism for controlling the distance D between the liquid level (10) and the inlet pipe (11) to constant. The control mechanism (16) is operated by means of a detecting signal from the liquid level controller (15). Reference numeral 17a represents a pressure switch which is provided to the steam generating device (1), and which detects the change in steam pressure in the tank (2) for the purpose of controlling a switch which switches the electricity supply to the heater (5). Reference numeral (18) represents a temperature controller which is provided to the outlet pipe (12), and reference numeral (19) represents a mist delivering pipe which is connected to the outlet pipe (12), and which delivers mist into an air flow.

Operation

Water (3) is supplied to the tank (2) through the water supply pipe (4), and the supplied water (3) is then heated by the heater (5) so as to generate steam. The generated steam is introduced into the insulating chamber (8) through the steam delivering pipe (7), the pipe (13), and the inlet pipe (11). The introduced steam is rapidly cooled down by liquid nitrogen (9), and is delivered into the air flow in the form of a mist (20) the temperature of which is slightly higher than that of the air flow through the outlet pipe (12) and the mist delivering pipe (19). The delivered mist (20) has a long visible duration and a tendency of being easily captured by the air flow.

During the aforementioned delivery of the mist (20) into the air flow, the liquid nitrogen (9) is gradually gasified, as a result of which, its liquid level is lowered. This lowering is detected by the liquid level controller (15), whereby the control mechanism (16) is so operated in accordance with the detected signal that the distance D between the liquid level (10) and the inlet pipe (11) can be kept constant. If the steam pressure in the tank (2) exceeds a predetermined level, the pressure switch 17a detects the fact, and controls so as to prevent current supply to the heater (5). As a result of this, the generation of the steam can be controlled to a predetermined amount. The heater (14) heats the pipe (13) so as to prevent the return of the steam to water because of fall in temperature.

The tank (2) is provided with a drain pipe (21), a relief valve (22) for reliving excessive steam, and a float switch (23) which acts to stop the current supply to the heater (5) in order to prevent the tank (2) from overheating when the amount of the water (3) becomes insufficient. A water supply valve (24) is provided to the water supply pipe (4). The steam delivering pipe (7) is provided with a control valve (25) which acts to control the flow rate of the steam and stop the supply of the steam. Heat insulating material or a heater may be fitted to the outlet pipe (12) so as to control the temperature of the delivered mist (20) with respect to that of the air flow. The temperature controller (18) may be used for examining how the mist (20) flows in accordance with the change in the temperature of the cooled steam which passes through the outlet pipe (12), or for stopping current supply to the heater (5) or closing the control valve (25) if the temperature of the inside of the insulating chamber (8) rises because the liquid nitrogen in the insulating chamber (8) becomes exhausted. The control mechanism (16) may, as shown in FIG. 1, be constituted: as the liquid level (10) lowers, the insulating chamber (8) is raised by means of a motor (26). Or, the control mechanism (16) may be constituted by, as shown in FIG. 2: as the liquid level (10) lowers, the inlet pipe (11) is lowered by means of the motor (26). The inlet pipe (11) may be manually controlled without using the control mechanism (16). The steam generating device (1) and the insulating chamber (8) may be installed on a car (33) to which casters are fitted for the purpose of realizing a free movement, or it may be fixed to a predetermined place.

Referring to FIGS. 3 through 6, another embodiment of the present invention will now be described. Reference numeral (1) represents a steam generating device which is provided with a water supply pipe (4) for supplying water (3) to a tank (2), a heater (5) for heating the water (3), and a pipe (7) for delivering steam (6). Reference numeral (8) represents an insulating chamber in which liquid nitrogen (9) as an example of a refrigerant is enclosed, and which is provided with an inlet pipe (11) and an outlet pipe (13) for delivering misty tracer (12) generated after steam (6) has been cooled down in the insulating chamber (8). Reference numeral (14) represents a pipe for introducing the steam (6) from the steam generating device (1) to the insulating chamber (8). One end of the pipe (14) is connected to the pipe (7), while the other end is connected to the inlet pipe (11). Reference numeral (15) represents a liquid level gauge which is provided to the insulating chamber (8), and which detects the liquid level (10) and indicates the amount of the liquid nitrogen (9). Reference numeral (16) represents a by-pass pipe one end of which is branched from the pipe (7), while the other end is connected to the outlet pipe (13). Reference numeral (17) represents a control valve which is connected to the intermediate position of the by-pass pipe (16), and which uses, for example, a electromagnetic valve. Reference numeral (18) represents a temperature controller which is provided to the outlet pipe (13), and which so controls the control valve (17) to open when the temperature of the tracer (12) passing through the outlet pipe (13) falls below a predetermined temperature. Reference numeral (19) represents a pressure switch which is provided to the steam generating device (1), and which detects the change in pressure of the steam (6) in the tank (2) and controls the operation of a switch which switches the current supply to the heater (5). Reference numeral (20) represents a tracer delivering pipe which is connected to the pipe (13), and which delivers the tracer (12) into an air flow (30) to be visually recognized. Operation The water (3) is supplied to the tank (2) through the water supply pipe (4). The supplied water (3) is heated by the heater (5) so as to generate the steam (6). The generated steam (6) is introduced into the insulating chamber (8) through the pipes (7) and (14) and the inlet pipe (11). The introduced steam (6) is rapidly cooled down by means of the liquid nitrogen (9), as a result of which, the misty tracer (12) is generated. The generated tracer (12) is passed through the outlet pipe (13), and is delivered through the tracer delivering pipe (20). Since the control valve (17) is opened in accordance with a control signal from the temperature controller (18) when the temperature of the tracer (12) is below a predetermined temperature which has been set at the temperature controller (18), the steam (6) which passes through the pipe (7) is in part supplied to the outlet pipe (13) through the by-pass pipe (16). As a result of this, the temperature of the tracer (12) is raised up to the aforementioned predetermined temperature. When the temperature of the tracer (12) reaches the aforementioned predetermined temperature, the control valve (17) is closed in accordance with the control signal from the temperature controller (18). As a result of this, the supply of the steam (6) to the outlet pipe (13) is stopped and rise in temperature of the tracer (12) is prevented. Thanks to the aforementioned control carried out by the temperature controller (18), the tracer (12) is delivered through the tracer delivering pipe (20) with the temperature of the tracer (12) kept at a predetermined temperature. A temperature to be set at the temperature controller (18) is determined after consideration of the temperature and humidity of the clean room in which the air flow (30) is passed through, and so forth. The temperature is determined to that at which the tracer (12) can be easily captured by the air flow (30), for example, when the temperature in the clean room is 23° C. to 25° C., the temperature of the tracer (12) is a predetermined value in the vicinity of the range of 50° C., or a predetermined range of the same.

The tracer (12) flows mixed with the ambient air after the tracer (12) is discharged from the pipe (20). Since the relative humidity of the tracer (12) is 100%, while that of air in the room is usually 50 to 80%, the relative humidity of the tracer (12) falls immediately after the tracer (12) is mixed with the air in the room if the temperature of the tracer (12) is the same as room temperature. As a result, small water drops in the tracer (12) start to evaporate resulting in a decrease in their diameter. Consequently, they vaporize and become invisible.

However, if the temperature of the tracer (12) is higher than room temperature, the temperature of the tracer (12) falls, and the maximum vapor pressure also falls as soon as the tracer (12) is mixed with the ambient air. As a result, the small water drops do not evaporate for a certain distance downstream from the position at which the tracer (12) starts flowing. In fact, they condense, and the tracer (12) further flows until it is sufficiently mixed with the room air, whereupon the small water drops evaporate. As described above, the distance through which the tracer (12) does not evaporate can be increased, so that the tracer (12) can be made visible for a longer distance.

In the embodiment shown in FIGS. 1 and 2, the temperature of the misty tracer (20) is raised so as to exceed room temperature by controlling the distance between the liquid level (10) and the inlet pipe (11). In the embodiment shown in FIGS. 3 to (6), the temperature of the tracer (12) is raised so as to exceed room temperature by controlling the amount of vapor supplied from the by-pass (16) to the outlet pipe (13).

In a state in which the steam generating device (1) is generating the steam (6), if the steam pressure in the tank (2) exceeds a predetermined level, the pressure switch (19) detects the fact, and controls to stop the current supply to the heater (5), whereby the generating of steam (6) is controlled to a predetermined level.

Figure 3:
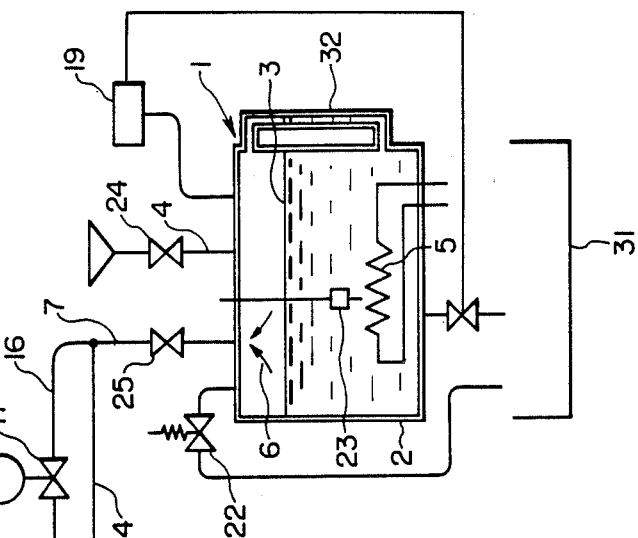
FIG. 3 is a schematic view illustrating another example of the air flow visualizing device according to the present invention.
Figure 4:
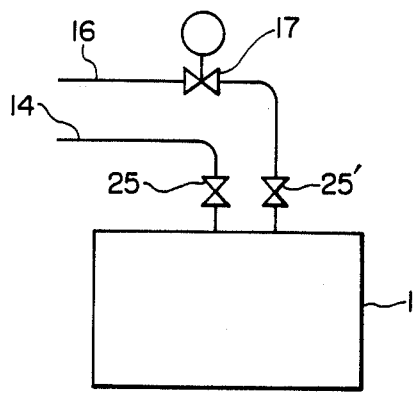
FIG. 4 illustrates an example in which the aforementioned structure is modified in part.
Figure 5:
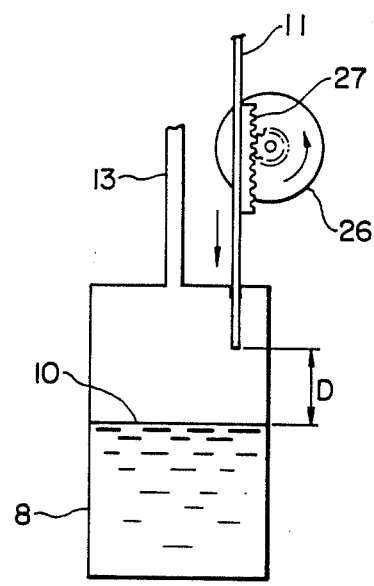
FIG. 5 is a schematic view illustrating an example of a control mechanism of the aforementioned structure.
Figure 6:
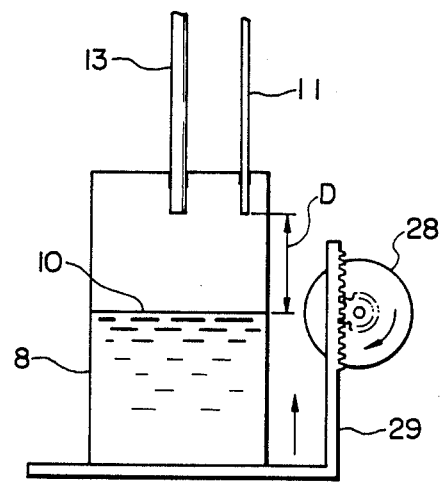
FIG. 6 is a schematic view illustrating another example of the control mechanism of the aforementioned structure.

The tank (2) is provided with a drain valve (21), a relief valve (22) for relieving excessive steam, a drain pan (31), a float switch (23) for stopping the current supply to the heater (5) if the amount of the water (3) becomes insufficient, and an water level gauge (32) for measuring the water level of the water (3). Pure water is used as the water (3). A water supply valve (24) is provided to the water supply pipe (4). A control valve (25) for controlling the flow of the steam (6) and stops the supply of the steam (6) is provided to the pipe (7). The pipe (16) may be, as shown in FIG. 2, connected to the tank (2) through the control valve (25)' with no branching from the pipe (7) employed. The pipes (14) and (16) may be provided with heat insulating material or a heater for the purpose of preventing the fall in temperature of the steam (6) and the return to water while it passes through the pipe (14). The temperature controller (18) may be used for stopping the current supply to the heater (5) or controlling the control valve (25) or the control valves (25) and (25)' to close when a temperature inside the insulating chamber (8) rises because of exhausted liquid nitrogen (9) in the insulating chamber (8). During the delivery of the tracer (12) into the air flow (30), the liquid level (10) of the liquid nitrogen (9) is lowered because of the gradual gasfication of the liquid nitrogen (9). In this state, the distance D between the liquid level (10) and the inlet pipe (11) must be controlled to be kept constant. The way of this control is exemplified, as shown in FIG. 3, by a mechanism (27) wherein as the liquid level (10) is lowered, the inlet pipe (11) is adapted to be lowered by means of a motor (26) in accordance with a detecting signal from the liquid level gauge (15). Another mechanism (29) is exemplified, as shown in FIG. 4, in which as the liquid level (10) is lowered, the insulating chamber (8) is adapted to be raised by means of a motor (28) in accordance with a detecting signal from the liquid level gauge (15). As an alternative to the aforementioned mechanisms, manual control of the inlet pipe (11) may be employed. The steam generating device (1) and the insulating chamber (8) may be installed on a car provided with casters so as to freely move, or they may be installed at a predetermined place.

Snce the present invention is constituted as mentioned above, the device according to the present invention displays the following advantages: the visible amount of the misty tracer can be increased up to 100% of the generated steam because the generated steam is rapidly cooled down by jetting it to a refrigerant, while in a device in which generated steam is not cooled down by a refrigerant, the amount of the visible misty tracer is limited to only a part of the generated steam.

By way of positively controlling the temperature of the delivered misty tracer to make it compatible with the air flow to be visually recognized, duration of the misty tracer kept in the air flow can be longthened. The misty tracer can be delivered a long distance depending only upon the effect of the air flow while being mixed with the air flow without occurrence of the separation from the air flow, that is, while being well captured by the air flow. Consequently, the visual recognition of the state of the air flow can be accurately realized by means of the lines and patterns drawn by the tracer.

A large quantity of clean, nonpoisonous, and safety misty tracer can be easily generated. Furthermore, the generating of droplets can be significantly reduced in comparison to the conventional device which generates pure water mist.

When the visual recognition of clean air flow in a clean room for the industrial purposes is realized, the clean room itself, as well as the machines and the devices which are or are to be installed in the clean room and the manufacturing process which uses the aforementioned machines and the devices can be kept clean without any bad influence such as pollution or the like.

The visual recognition of the air flow can be realized even while the machines and the devices are operated, or they are operated by workers.

The device according to the present invention can apply to a device for realizing the visual recognition of a clean air flow in a super-clean space. The device can also apply to a device for studying the positions and layout of machines and devices in a clean room for the industrial purposes or other spaces in which air flows.

Safety can be secured during the operation of the device.

What is claimed is:

1. An air flow visualizing device, comprising in combination:

(a) a steam generating first vertical container device (1), having heating means (5) therein, said first container being disposed to receive a steam producing liquid therein, a vertical steam delivery pipe (7) with a valve (25) extending out of said first container, a heated horizontal carrying pipe coupled to said valve (25) to receive delivered steam;

(b) pressure sensing means coupled to said first container to detect changes in steam pressure in said container so as to control a switch operating the electricity supply to the heating means (5);

(c) an insulating second vertical container (8), with a bottom member, said second container being designed to hold a liquid refrigerant such as liquid nitrogen over said bottom member, a vertical steam inlet pipe member coupled to said horizontal carrying pipe and extending down into said second container for feeding steam therein from the lower end of said pipe member;

(d) a liquid level controller in said second container cooperating with a control mechanism outside said second container, said control mechanism acting to raise or lower one of said members with respect to the other of said member in response to signals from said liquid level controller so as to define a predetermined depth between the liquid level of the refrigerant in said second container and the lower end of said pipe member;

(e) an outlet pipe extending vertically out from said second container ending in a mist delivery pipe with mist delivery apertures; and, (e) temperature control means connected to said outlet pipe.

2. A device as claimed in claim 1 wherein said control mechanism acting to raise or lower one of said members includes rack and pinion gearing.

3. A device as claimed in claim 1 wherein the liquid level controller extends into the refrigerant and the control mechanism which is outside the second container raises and lowers said bottom member.

4. A device as claimed in claim 1 wherein the liquid level controller extends into the refrigerant and the control mechanism raises and lowers the steam pipe member.

* * * * *